United States Patent Office 3,034,847
Patented May 15, 1962

3,034,847
DYEING POLYETHYLENE TEREPHTHALATE FILMS WITH HOT DISPERSE DYE-ORGANIC SOLVENT MIXTURE
Aurelius Franklin Chapman, Wilmington, Del., assignor to E. I. du Pont de Nemours and Company, Wilmington, Del., a corporation of Delaware
No Drawing. Filed Oct. 1, 1957, Ser. No. 687,358
7 Claims. (Cl. 8—4)

This invention relates to the coloring of film, and more particularly to a process for dyeing film of polyethylene terephthalate.

Polyethylene terephthalate film, more particularly polyethylene terephthalate film which has been oriented by stretching and/or rolling in two directions and heat-set at elevated temperatures under tension, exhibits outstanding chemical, physical and electrical properties which make it an outstanding material for a wide variety of end uses. Polyethylene terephthalate film, however, has a poor affinity for dyestuffs and does not absorb aqueous liquids to any appreciable extent, and, as a consequence, difficulties are experienced in satisfactorily dyeing it, especially when in a highly oriented form.

Existing methods for the dyeing of polyethylene terephthalate film are complicated and also often involve the use of costly equipment and multiple operations. As a result, colored polyethylene terephthalate film cannot be prepared on the existing equipment now normally employed by film converters in producing film for such end uses as packaging, metallizing and overwrapping.

An object of this invention, therefore, is to provide a simple, economical process for dyeing polyethylene terephthalate film, which process may be carried out on existing film processing equipment. A further object is to provide a simple and economical process for dyeing oriented, heat-set polyethylene terephthalate film. The foregoing and other objects will more clearly appear hereinafter.

These objects are realized by the present invention which, briefly stated, comprises coating the surface of polyethylene terephthalate film with a homogeneous composition comprising essentially a disperse type dye uniformly distributed in an organic liquid which uniformly (evenly) wets the surface of polyethylene terephthalate film, and thereafter heating the coated film to a temperature of from 150° to 200° C. for a period of time sufficient to set the dye, i.e., to cause the dye to penetrate the surface of the film and hence become affixed in the film.

The dyestuffs applicable in accordance with the process of the present invention are dyestuffs known as disperse dyes. Lubs, in "The Chemistry of Synthetic Dye Pigments," refers to these dyes as "organic colors which are applied from near-colloidal aqueous dispersions to textile fibers in which the dyes literally dissolve to produce the desired coloration." These dyestuffs are particularly adaptable for use on fibers of cellulose acetate, polyamides and polyesters such as polyethylene terephthalate. Disperse dyes include colors of the azo, azomethine, nitroarene and anthraquinone chemical classes. Specific examples of disperse dyes particularly useful in the process of the present invention are:

3-nitro-N⁴-phenylsulfanilanilide (a yellow dye)
p-[p-(Phenylazo)phenylazo]phenol (a red-yellow dye)
Ethyl 4-hydroxy-1-anthraquinonecarbamate (an orange dye)
1-amino-4-hydoxy-2-methoxyanthraquinone (a pink dye)
1-amino-4-hydroxyanthraquinone (a red dye)
1 - amino - 2-bromo-4-hydroxyanthraquinone (a blue-red dye)
1 - (2 - hydroxyethylamino)-4-methylaminoanthraquinone (a red-blue dye)

1,4 - diamino - N - (2 - hydroxyethyl)-2,3-anthraquinonedicarboximide (a greenish-blue dye)
4,5-diaminochrysazin (a blue dye)
1-anilino-4-hydroxyanthraquinone (a violet dye)

Any organic liquid which will serve to wet the surface of the polyethylene terephthalate film (i.e., uniformly adhere to the surface in the form of a continuous film) may be utilized. Methyl ethyl ketone is preferred because of its superior wetting action, high volatility and cheapness. Other suitable organic liquids include benzyl alcohol, toluene, methyl isobutyl ketone, anisole, ethyl acetate, cyclohexanone, and a mixture of dimethyl acetamide and methyl ethyl ketone.

The concentration of dyestuff suspended and/or dissolved in the organic liquid may range from 1%-6% by weight based on the total weight of the composition.

Depending on the depth of color required, it is preferred that the concentration of dyestuff in the organic liquid range between 4%-5% by weight. Normally, the desired fine suspensions of dyestuff are obtained by conventional mixing procedures. In certain cases, however, as when the dyestuff is suspended with difficulty in the organic liquid, it may be necessary to adopt a procedure such as ball milling the organic liquid dyestuff mixture. Color depth may, in most instances, be obtained by varying the dye concentration in the organic solvent. However, deeper shades which are beyond the dye suspension in a desired organic liquid may be obtained by a multi-pass operation.

The dyestuff may be applied to the film in the form of a uniform layer by any convenient conventional coating or printing expedient, e.g., by means of a gravure roll such as is used in a conventional laminating or printing equipment. The speed of application will depend on the pattern or type of roll used, and the depth of shade required. Speeds of 15–70 feet/minute were found to be practical using an applicator station with gravure rolls having 50–165 lines/inch knurls.

The time of heat-setting, i.e., the duration of the heat-treatment to cause the dyestuffs to penetrate into the surface of the film, will range from about a second to as long as 15 minutes and will depend on the concentration of dyestuff on the surface, the speed of the film through the heat-treating apparatus, etc. Normally, as little as 1–10 seconds at 150° C. will suffice for heat-setting the dye to the surface of the film, depending on the machine speed and heating surface available. Contact heat-setting accomplished by wrapping the dye coated film around a heated metal roll (150°–200° C.) is particularly effective to force the dyestuff to penetrate the surface of the film.

The process of the present invention concerns itself with the coloring of polyethylene terephthalate film. More particularly, it relates to the coloring of polyethylene terephthalate film which has been oriented and heat-set, i.e., stretched and/or rolled to substantially the same amount in both the longitudinal and transverse directions and heat-set at elevated temperatures under tension.

The following specific examples of preferred embodiments will serve to further illustrate the principles and practice of this invention. Parts are by weight unless otherwise indicated.

*Example 1*

2.9 parts of 3-nitro-N⁴-phenylsulfanilanilide (a medium yellow dye) and 0.9 part of 1-amino-4-hydroxy-2-methoxyanthraquinone (a pink dye) were admixed to form a fine suspension in 100 parts of methyl ethyl ketone. The resulting dye dispersion was applied to 0.0005" thick, oriented polyethylene terephthalate film by means of a 50 line/inch knurled roll. The film speed through the roll was 15 feet/minute. The dyestuff was set into the surface of the film by passing the film through a conventional drying apparatus at 150° C. for 40 seconds. Good adhesion between the dye and the film was obtained. The film had a gold color which rendered it suitable for the metallic yarn field.

*Example 2*

5 parts of 1-anilino-4-hydroxyanthraquinone (a violet dye) were suspended in 100 parts of cold benzyl alcohol solution. The resulting dye suspension was applied to 0.0010″ thick, oriented polyethylene terephthalate film by means of a 75 line/inch knurled roll. The film speed through the roll was 7 feet/minute. The dyestuff was set into the film surface by passing the film through a 5 foot conventional drying apparatus at 150° C. for 3 seconds. Good adhesion between the dye and the film was obtained. The film was colored a deep violet.

*Example 3*

3.0 parts of 1,4-diamino-N-(2-hydroxyethyl)-2,3-anthraquinone-dicarboximide (a greenish-blue dye) were suspended in 100 parts of cold methyl ethyl ketone. The resulting dye suspension was applied to 0.0010″ thick, oriented polyethylene terephthalate film by means of a 75 line/inch knurled roll. The film speed through the applicator station was about 20 feet/minute. The dyestuff was set into the film surface by passing the film through a 10 foot conventional dryer at 165° C. for 30 seconds. Good penetration of the dye into the film was obtained. The film was colored a light blue.

*Example 4*

Polyethylene terephthalate film (oriented and heat-set) was permanently dyed from a dispersion of 5 parts of ethyl 4-hydroxy-1-anthraquinone-carbamate (an orange dye) in 100 parts of cold methyl ethyl ketone in a manner similar to that described in Example 3. The dye was set into the film by heating at 150° C. for 3 minutes. The film was colored a deep orange.

*Example 5*

2 parts of 3-nitro-N-phenylsulfanilanilide (a yellow dye) and 4.5 parts of ethyl 4-hydroxy-1-anthraquinone carbamate were admixed to form a fine suspension in 100 parts of cold methyl ethyl ketone. The dyestuff dispersion was applied to 0.0010″ thick, biaxially oriented, heat-set polyethylene terephthalate film in a manner similar to that described in Example 3 and subsequently heated to 150° C. for 13 minutes. Good dye penetration was obtained and the film was dyed a deep gold color.

*Example 6*

2 parts of 3-nitro-N-phenyl sulfanilanilide (a yellow dye), 0.2 part of 1,4-diamino-N-(2-hydroxy ethyl) 2,3-anthraquinone-dicarboximide (a greenish-bule dye), and 0.2 part of 1-amino-4-hydroxy-2-methoxyanthraquinone (a pink dye) were mixed to form a fine suspension in 100 parts of cold methyl ethyl ketone. The resulting dye composition was coated onto 0.0010″ thick, oriented polyethylene terephthalate film in a manner similar to that described in Example 3. The dyestuff was set into the film by heating to 150° C. for 3 minutes. The film was dyed a yellow-orange shade.

I claim:

1. A process for dyeing polyethylene terephthalate film which comprises coating the surface of polyethylene terephthalate film with a homogeneous composition comprising essentially a disperse type dye uniformly distributed in an organic liquid selected from the group consisting of methyl ethyl ketone, benzyl alcohol, toluene, methyl isobutyl ketone, anisole, ethyl acetate, cyclohexanone, and a mixture of dimethyl acetamide and methyl ethyl ketone, which uniformly adheres in the form of a continuous film to the surface of polyethylene terephthalate film, and thereafter heating the coated film at a temperature of from 150° to 200° C. for a period of time sufficient to cause the dye to penetrate the surface of the film.

2. The process of claim 1 wherein the organic liquid is methyl ethyl ketone.

3. A process for dyeing polyethylene terephthalate film which comprises coating the surface of polyethylene terephthalate film with a homogeneous composition comprising essentially an organic liquid selected from the group consisting of methyl ethyl ketone, benzyl alcohol, toluene, methyl isobutyl ketone, anisole, ethyl acetate, cyclohexanone, and a mixture of dimethyl acetamide and methyl ethyl ketone, which uniformly adheres in the form of a continuous film to the surface of polyethylene terephthalate film, said liquid containing from 1% to 6% by weight of a disperse type dye uniformly distributed therein, and thereafter heating the coated film to a temperature of from 150° to 200° C. for at least 1 second.

4. The process of claim 3 wherein said composition contains from 4% to 5% by weight of a disperse type dye.

5. The process of claim 3 wherein the film is oriented, heat-set polyethylene terephthalate film.

6. The process of claim 3 wherein the organic liquid is methyl ethyl ketone.

7. The process of claim 6 wherein the film is oriented, heat-set polyethylene terephthalate film.

References Cited in the file of this patent

UNITED STATES PATENTS

| | | |
|---|---|---|
| 2,474,088 | Brown | June 21, 1949 |
| 2,532,437 | Baker | Dec. 5, 1950 |
| 2,593,405 | Beckham | Apr. 22, 1952 |
| 2,609,269 | Ryan | Sept. 2, 1952 |
| 2,636,420 | Ryan | Apr. 28, 1953 |
| 2,663,612 | Gibson | Dec. 22, 1953 |
| 2,663,613 | Gibson | Dec. 22, 1953 |

FOREIGN PATENTS

| | | |
|---|---|---|
| 1,095,941 | France | June 7, 1955 |
| 735,171 | Great Britain | Aug. 17, 1955 |

OTHER REFERENCES

Schwartz et al.: Surface Active Agents and Detergents, vol. II, pp. 405–406, pub. 1958 by Interscience Pub., New York City.

J.S.D.C., January 1954, pp. 16–21.

Fern: J.S.D.C., December 1955, pp. 842–843.

J.S.D.C., March 1956, p. 123.